T. B. DE FOREST.
MACHINE FOR MANUFACTURING RUBBER HOSE.
No. 17,029. Patented Apr. 14, 1857.
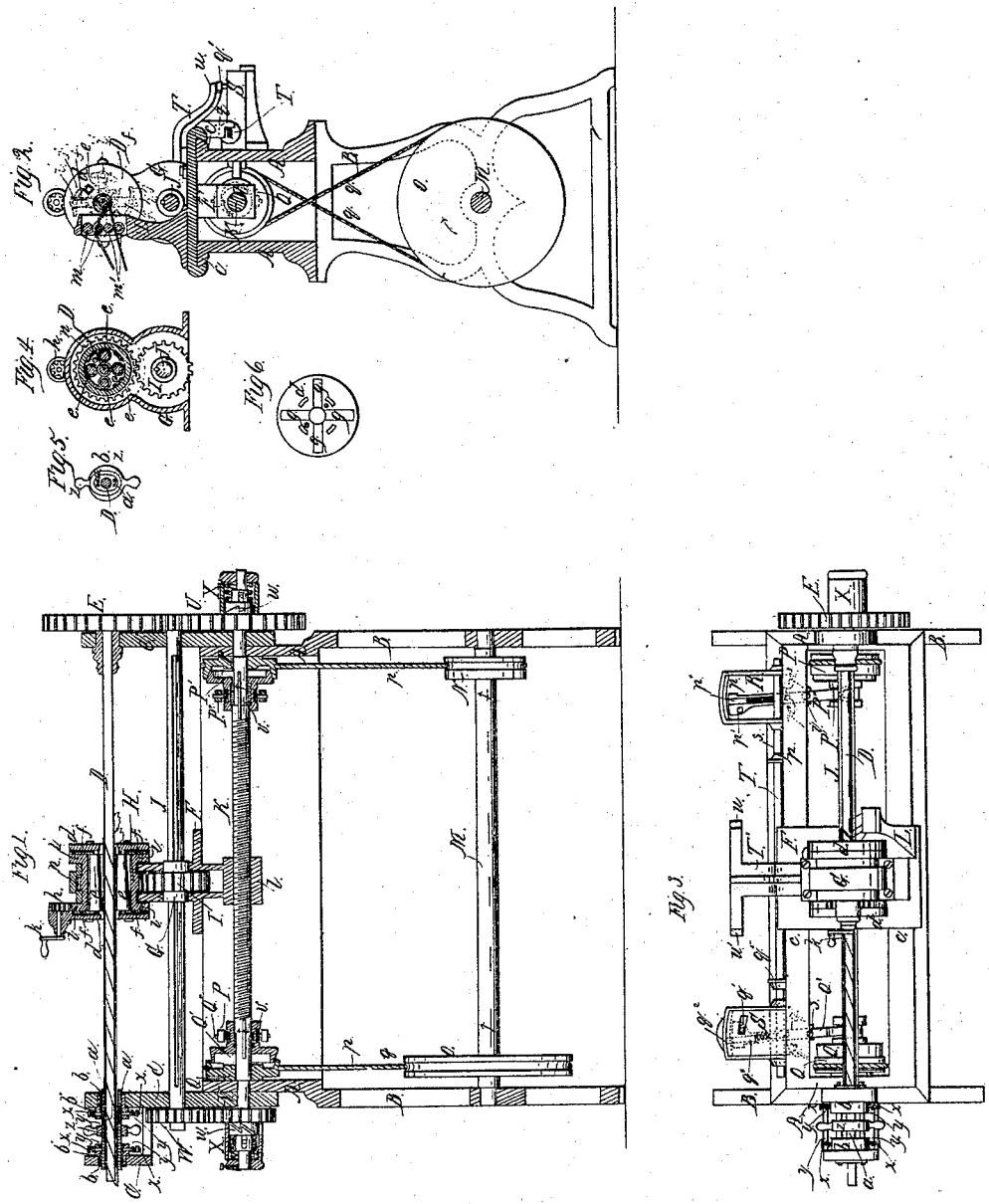

UNITED STATES PATENT OFFICE.

T. B. DE FOREST, OF BIRMINGHAM, CONNECTICUT.

MACHINERY FOR MANUFACTURING INDIA-RUBBER HOSE.

Specification of Letters Patent No. 17,029, dated April 14, 1857.

*To all whom it may concern:*

Be it known that I, THOMAS B. DE FOREST, of Birmingham, in the county of New Haven and State of Connecticut, have invented certain new and useful Improvements in Machinery for Making India-Rubber and other Hose; and I do hereby declare that the following is a full, clear, and exact description of the same, reference being had to the accompanying drawings, making a part of this specification, in which—

Figure 1 is a longitudinal central vertical section of a machine having all my improvements. Fig. 2 is a transverse vertical section of the same, in the line $x, x$, of Fig. 1. Fig. 3 is a plan of the same. Fig. 4 is a transverse vertical section of the headstock G, that is shown in Figs. 1, 2, and 3. Fig. 5 is a section of the clamps $a, a$, and their appendages, that are shown at the left hand end of Figs. 1 and 3. Fig. 6 is an inside face-view of one of the heads $d, d$, of the box H, that is shown in Figs. 1, 2, 3, and 4.

Similar letters of reference indicate corresponding parts in the several figures.

The machinery to which this invention relates forms the hose by winding one or more strips or fillets of india-rubber or other material spirally around a mandrel, and is more especially intended for the manufacture of the hose as described and claimed in the Letters Patent of Jacob H. Howell, dated October 21, 1856.

The principal operating parts of the machine consist of the mandrel, on which the hose is formed; guide rollers, for conducting the fillet or fillets to the mandrel; and pressure rollers, for pressing the fillet or fillets, after being wound upon the mandrel, and thus causing the adhesion of the edges or laps. These elements are the same as the elements of the machine described in the specification of the aforesaid Letters Patent; but my invention consists in certain improvements in the construction, arrangement, application, and mode of operating the said elements, and in certain mechanical devices employed in combination therewith, to enable the hose to be manufactured better and more expeditiously than by the machine described by Jacob H. Howell.

To enable others to make and use my invention, I will proceed to describe its construction and operation.

A is a bed-piece, supported upon two standards B, B, and having bolted to or cast with it two standards C, $C^1$, one at each end. D, is the mandrel, upon which the fillets are wound to form the hose, one end of which is keyed into a spur gear E, whose hub turns in a bearing in the standard $C^1$, and the other end passes through two collars $b, b$, which are fitted to rotate in the standard C, and contain two clamps $a, a$, by which the hose is confined to the mandrel during the winding operation.

F, is a carriage fitted to slide on ways $c, c$, on the top of the bed-piece A. This carriage supports a headstock G, to which is fitted a revolving flanged cylindrical box H, with movable heads $d, d$, through the center of which passes the mandrel D; said box containing the pressure rollers $e, e$, of which four are represented, but any number may be used; the said rollers being of a slightly taper form, as shown in Fig. 1, and having journals at their ends which are received in bearings in sliding pieces $f, f$, which are fitted to slide in radial grooves $g, g$, in the heads $d, d$, of the box. The grooves $g, g$, are shown in Fig. 6. The sliding pieces $f, f$, are provided on their inner faces, near the outer extremities thereof, with studs $i$, which enter eccentric grooves $j, j$, in the flanges of the box. These grooves are shown in Fig. 2, in dotted outline. The two heads $d, d$, are connected together by bolts passing longitudinally through the box, and so fitted to the box H, that both will turn together, independently of the box. By turning the heads in the box, the studs $i, i$, are caused to move in the eccentric grooves $j, j;$ and by that means, the sliding pieces $f, f$, and with them the pressure rollers, are caused to move toward or from the center of the box, thus enabling the pressure rollers to be all adjusted simultaneously for the manufacture of hose from fillets of various thicknesses, and enabling them to be removed all together from contact with the hose. For convenience of turning the heads to adjust the rollers a portion of one of the flanges of the box is toothed and geared with a pinion $h$, the axle of which turns in a bearing attached securely to one of the heads $f$, and is provided with a handle $k$, to turn the pinion. The box H has a toothed ring $n$, on its exterior, within the box, gearing with a spur-gear I, also within the box; the said gear being fitted with a feather and groove to a shaft J, which is arranged parallel with the mandrel D, and is fitted in bearings in the standards C, C¹. The carriage F, has secured to its bottom a nut $l$, which receives a long screw K, arranged parallel with the shaft J, and the mandrel D; said screw having journals at its ends, fitted to turn in bearings in the ends of the bed-piece A. The carriage F also carries a standard L, which may contain two or more pairs of guide rollers to guide the fillets into the mandrel, but is represented as containing two pairs $m, m$, and $m^1 m^1$.

M, is the driving shaft of the machine, carrying two pulleys N, O, from the former of which a straight band $p$, runs around the loose portion P of a friction clutch P P¹, that is fitted to the shaft of the screw K; and from the latter of which a crossed band $q$, runs around the loose portion Q of a friction clutch Q Q¹, that is also fitted to the shaft of the screw. The parts P, Q, of the clutches are fitted to rotate, but not to move longitudinally upon the shaft; but the parts P¹, Q¹, are fitted to slide but not rotate thereon, and are furnished with springs $v, v$, to throw them into gear with the parts P and Q.

The sliding portion P¹, of the clutch P, P¹, is fitted to a forked lever P*, which works on a fulcrum $r$, and the outer extremity of the said lever enters a box R, at the back of the bed-piece A, and carries within the said box a spring sliding bolt $p^*$, for which a notch $p^2$, is provided in the back of the box, and also carries a pin $p^1$, which works through a slot in the top of the box. The sliding portion Q¹, of the clutch, Q, Q¹, is fitted to a forked lever Q*, working on a fulcrum $s$, and entering a box S at the back of the bed; the said lever being like P*, and carrying a sliding bolt $q^*$, and pin $q^1$, like $p^*$, and $p^1$; and the box S containing a notch $q^2$, like the notch $p^2$, in the box R. At the back of the bed-piece A, there is also a straight sliding bar T, which works through both boxes R, and S; said bar carrying two wedges $p^3$, and $q^3$, to act upon pins $p^4$, and $q^4$, standing up from the bolts $p^*$ and $q^*$ for the purpose of drawing the bolts from the notches $p^2$, and $q^2$, and being furnished with collars $p^5$, and $q^5$, to be struck, for the purpose of producing the operation of the wedges $p^3$, and $q^3$, by a tappet $t$, (see Fig. 2) attached to an arm T*, at the rear of the carriage F; the said collars being so adjusted as to be struck by the tappet just before the termination of the movement of the carriage in either direction along the bed-piece A. The same arm T*, carries two other tappets $u, u^1$, for the purpose of operating on the pins $p^1$, and $q^1$, to actuate the levers for the purpose of disconnecting one or other of the clutches P, P¹, and Q, Q¹, just as the carriage arrives near one or other end of the bed-piece. The shaft of the screw K, carries at one end a spur gear U, gearing with the gear E, in which the mandrel is secured, and at the other end a smaller spur gear V, gearing with a gear W, that is fast on the shaft J. Both the gears U, and V, are fitted loosely to the screw-shaft K, but are connected with the shaft so as to rotate with it, only when it rotates in the direction indicated by the arrows shown in Figs. 1 and 2, by means of the ratchet clutches $w, w$, one part of each of which is fast to its respective gear and the other part fitted to the shaft so as not to turn with it, but so as to slide longitudinally thereon, within a spring box X, that is fast to the shaft. These clutches allow the screw shaft to rotate in the opposite direction to the arrows, without causing the rotation of the gears U and V.

The clamps which are shown at the right hand of Figs. 1 and 2, and in Fig. 5, consist of two metal bars with concave inner faces, arranged parallel to the mandrel D, within the two collars $b, b$, before mentioned. Each clamp has two screws or headed pins $x, x$, screwed into it, one of the said pins passing loosely through each of the collars $b, b$. Spiral springs, $y, y$, are placed between the exterior of the clamps and the heads of the screws or pins $x, x$, for the purpose of opening the clamps; and a collar $z$, of elliptic form, as shown in Fig. 2, is made to embrace the clamps between the collars $b, b$; said collar $z$, serving to tighten the clamps upon the hose or to release them so as to allow them to be opened by the springs $y, y$, by turning it a quarter of a revolution upon the clamps. The collars $b, b$, are each made with a flange $b^*, b^*$, as shown in Fig. 1, and by that means the clamps are confined so as not to move longitudinally in the headstock C, though free to rotate therein.

The operation of the machine is as follows:—The carriage F is first run up as close as possible to the standard C, which contains the clamps. Then the end or ends of the fillet or fillets of which the hose is to made, (represented in Figs. 1, 2, and 3, in red outline,) is or are conducted through one or more pairs of the guide rollers $m, m, m^1, m^1$, and wound around the mandrel by hand till a piece of hose is produced of a sufficient length to pass through the box H, and to be received within the clamps $a, a$, after which the clamps are closed to secure the hose to the mandrel, and the pressure rollers $e, e$, which up to this time have been thrown to their greatest distance apart, are adjusted by turning the handle $k$, to give the desired pressure. In the above specified position of the carriage F, the lever Q, is locked, by its bolt $q^*$, being in the notch $q^2$, which holds the part Q, of the clutch Q, Q¹, uncoupled, but the lever P*, being unlocked, the clutch P, P¹, is held coupled by its spring $v$. This condition of the clutches, &c., is illustrated in Figs. 1 and 3. On motion being communicated to the main shaft M, by any suitable means, in the direction of the arrows shown upon it, the belt $p$, is caused to give motion to the screw K, in the same direction; the mandrel D, and clamps $a$, $a$, have motion imparted to them in the opposite direction to the screw by the gears U, E; and the shaft J is caused to receive motion in the same direction as the mandrel through the gears V, W. The screw K, gives the carriage F, and with it, the guide rollers $m$, $m$, $m^1$, $m^1$, and pressure rollers $e$, $e$, a movement from the clamps $a$, $a$, toward the opposite end of the machine; and by that means, as the mandrel and clamps rotate and wind up the fillet or fillets on the mandrel, the guide rollers, by their movement longitudinally to the mandrel, are caused to lay the fillet or fillets in a spiral direction, as shown in red lines on the left hand portion of the mandrel, in Figs. 1 and 2. It must be observed, however, that the relative sizes of the gears E, and U, must be so proportioned to the pitch of the screw K, and to the widths of the fillet or fillets, that the edges of the fillet will be laid close and with only the proper lap that is produced by leveling the edges. At the same time that the winding is performed, the necessary pressure to cause the adhesion of the fillet is given by the rollers $e$, $e$, which derive their rolling motion through the friction produced between their peripheries and the surface of the fillet or fillets, as the hose rotates with the mandrel, and the box H rotates around it. The taper form of the rollers $e$, $e$, illustrated in Fig. 1, causes them to press first very gently and gradually harder as they pass farther along the hose; the greatest pressure being of course produced by the larger ends which are farthest from the guide-rollers. This prevents the fillet being puckered in the hose as it forces any slackness toward the point where the winding takes place. The operation continues as above described till the carriage F has nearly reached the standard C¹, by which time the hose is formed nearly the whole length of the mandrel, when the tappet $u$, comes in contact with the pin $p^1$, on the lever P*, and the tappet $t$, comes in contact with the collar $p^5$, on the bar T, and the lever P* and bar T begin to move with the carriage F. The movement of the lever P* uncouples the clutch P, P¹, and the movement of the lever T causes the wedge $q^3$, to operate on the pin $q^4$, and draw the bolt $q^*$ out of the notch $q^2$, thus liberating the lever Q*, and allowing the clutch Q, Q¹, to be coupled by the action of its spring $v$. The tappet $u$, pushes the lever P*, far enough for its bolt $p^*$, to slip into the notch $p^2$, and thus to hold the lever P* with the clutch P, P¹, out of gear. At the instant this change of condition of the clutches takes place, an attendant turns the collar $z$, to allow the clamps $a$, $a$, to open. The uncoupling of the clutch P, P¹, renders the straight band $p$, inoperative on the screw K; but the coupling of the clutch Q, Q¹, makes the crossed band $q$, operative and causes the screw to rotate in the opposite direction to that before described, and thus to move the carriage F, with the pressure rollers and guide rollers, back toward the standard C. During this movement, the rotations of the mandrel D, and the roller box H, are suspended, as the clutches $w$, $w$, are inoperative, and the screw rotates without the wheels U, V; and the pressure rollers, being still tightly pressed upon the hose, slide it back through the open clamps, pushing the finished portion longitudinally off the now stationary mandrel. This return movement of the carriage is very much more rapid than the first-described movement, during which the hose is formed, owing to the greater velocity of the screw caused by the larger size of the pulley O, as compared with that N. As the carriage arrives near the standard C, the tappet $u^1$, comes into contact with the pin $q^1$, of the lever Q*, and the tappet $t$, comes into contact with the collar $q^5$, of the sliding bar T; and the levers P* and Q*, and their appendages, are thus caused to be operated upon in a manner precisely the reverse of that in which they were operated upon as the carriage arrived at the other end of the machine, and the clutch Q, Q¹, is thereby caused to be uncoupled, and that P, P¹, to be coupled; thus causing the rotation of the screw to be reversed again, and the mandrel D and roller box H, to commence rotating again to continue the winding of the fillet or fillets to form the hose, as at first described. It is necessary, however, for the attendant to turn the collar L, on the clamps at the time the reversal of the screw is being effected, in order again to secure the hose to the mandrel before the revolution of the mandrel again commences. In the manufacture of the hose, a suitable solvent or cement is applied when necessary to the edges or parts to be united.

It will be seen by the foregoing description that the machine is, with the exception of the clamps $a$, $a$, entirely self-acting; the hose being slipped off the mandrel by the action of the machine itself as soon as it has been formed along the whole length of the mandrel, without the necessity of moving the mandrel from its operative position in the machine to get the hose off it. In this machine, the hose may be made of any length.

One important feature in which the machine differs from that described in the specification of Letters Patent of J. H. Howell, consists in its having its mandrel rotate to wind up the fillet or fillets, independently of the pressure rollers, which have nothing to do with the winding, by which means the fillet or fillets is or are laid more evenly and free from creases than when the mandrel derives its rotary motion from the pressure rollers.

It is obvious that the same results as herein described may be obtained by giving a longitudinal movement to the mandrel instead of to the pressure and guide rollers. The employment of the short pressure rollers, and the giving of a longitudinal movement to the guide rollers or the mandrel, relatively to each other, constitute one of the most important features of the invention; as it is what enables the machine to be made self-acting, which it cannot be when the rollers are as long as the effective length of the mandrel, as in the machine described in the patent of J. H. Howell, aforesaid.

I do not claim generally, the combination of a rotating mandrel, pressure rollers, and guide rollers, for the purpose of forming india-rubber hose. But

What I claim as my invention, and desire to secure by Letters-Patent, is:

1. The employment of a pressure roller or rollers $e, e$, of a length equal to a comparatively small portion of the length of the mandrel, when such roller or rollers, or the mandrel, have a longitudinal movement, substantially as and for the purpose set forth.

2. Giving the mandrel a rotary motion independently of the pressure rollers, and causing the latter to derive motion from the mandrel, substantially as and for the purpose herein set forth.

3. Making the pressure rollers of a tapering form, so as to exert less pressure nearest where the laying or winding of the fillet or fillets takes place, and a gradually increasing pressure as the wound fillet advances farther between them, substantially as herein described, for the purposes set forth.

4. The mode of operating the mandrel, and the pressure and guide rollers, whereby the fillets are first wound upon the mandrel to form the hose, and the hose is afterward pushed longitudinally off the mandrel, substantially as herein described, viz., by giving rotary motion to the mandrel, while the carriage which contains or supports the rollers moves in one direction longitudinally in relation to the mandrel, and suspending the said rotary motion while the rollers move in the opposite direction.

5. The combination of the clamps $a, a$, flanged collars $b, b$, pins or screws $x$, springs $y, y$, and elliptic collar $z$, applied and operating in the headstock $C^1$, to clamp the hose to the mandrel and liberate it therefrom, substantially as herein set forth.

6. The combination of the two spring clutches P, $P^1$, and Q, Q, the levers $P^*$, $Q^*$, the spring bolts $p^*$, $q^*$, the tappets $t, u, u^1$, and the sliding bar T, the whole operating together as herein described, to cause the roller-carriage to be driven in opposite directions alternately.

T. B. DE FOREST.

Witnesses:
W. HOBSON,
J. OSCAR HARGER.